United States Patent [19]

Neufeld

[11] 4,353,514
[45] Oct. 12, 1982

[54] BACK SUPPORT HOUSING AND REEL BODY ASSEMBLY

[75] Inventor: Henry L. Neufeld, Tulsa, Okla.

[73] Assignee: Brunswick Corporation, Skokie, Ill.

[21] Appl. No.: 218,924

[22] Filed: Dec. 22, 1980

[51] Int. Cl.³ .............................................. A01K 89/01
[52] U.S. Cl. ............................................... 242/84.2 A
[58] Field of Search .................... 242/84.2 A, 84.2 R, 242/84.2 F, 84.21 R, 84.21 A

[56] References Cited

U.S. PATENT DOCUMENTS 2,613,468 10/1952 Hand ............................... 242/84.2 A
3,105,651 10/1963 Hull ................................ 242/84.2 A Primary Examiner—Billy S. Taylor
Attorney, Agent, or Firm—John G. Heimovics

[57] ABSTRACT

A spin casting style fishing reel is disclosed having generally a reel body, a front cover, and a back support housing with a stem extending therefrom and capable of being connected to a fishing rod. The reel body has a deck plate and a portion projecting rearwardly from the deck plate and having an offset ledge. The deck plate has at least three spaced apart bosses, each boss having an aperture aligned with an aperture in the deck plate. Bosses are also provided in the back support housing, which bosses align with the bosses of the reel body, the reel body being mounted to the back support housing by securing appropriate fastening means such as screws through the apertures in the bosses. When so mounted, both sets of bosses engage to support the back support housing and the reel body in such a manner that the rim of the back support housing is spaced from the offset ledge and rear edge of the reel body. The structure substantially eliminates distortion of the reel body, thereby reducing binding and malfunction of the reel.

2 Claims, 8 Drawing Figures

BACK SUPPORT HOUSING AND REEL BODY ASSEMBLY

DESCRIPTION

1. Technical Field

This invention relates to a fishing reel and more particularly to the connection between a back support housing and a reel body of a spin casting style fishing reel.

2. Background Art

Numerous types of fishing reels are on the market and are well known. Generally, the spin casting style fishing reels are constructed of three major components: a rear housing, a front housing and a central body. Generally, the central body is mounted either between the two housing components or entirely inside those components. When the mounting is between the two housing components, it is necessary that the body be rigidly mounted to one of the housing components.

When the central body has been mounted between the housing components (i.e. with a portion of the body itself becoming part of the housing), those bodies have been tightly secured to one of the housings by well known constructions such as threaded screws. However, the pressure applied by those threaded screws to mount the body to a housing component has generally been exerted around the entire circumference of the body due to the press fit of the edge of the body to the rim of the housing component. However, since the pressure is applied by the screw at another location, stresses develop across the entire body. Those stresses distort the body, such distortion sometimes being sufficient to cause binding which interferes with the proper operation of the reel. A simple example of the manner in which such distortion can occur can be seen by supporting any object around its perimeter and then pressing down at some point inside the perimeter.

This invention is directed to overcoming one or more of the problems as set forth above.

DISCLOSURE OF THE INVENTION

A spin casting style fishing reel is disclosed having generally a reel body, a front cover, and a back support housing with a stem extending therefrom and capable of being connected to a fishing rod. The reel body has a deck plate and a portion projecting rearwardly from said deck plate and having an offset ledge. The deck plate has at least three spaced apart bosses, each boss having an aperture aligned with an aperture in the deck plate. Bosses are also provided in the back support housing, which bosses align with the bosses of the reel body, said reel body being mounted to said back support housing by the securing of appropriate fastening means such as screws through the apertures in the bosses. When so mounted, both sets of bosses engage to support the back support housing and the reel body in such a manner that the rim of the housing is spaced from the offset ledge and rear edge of the rearward portion.

Mounting the reel body to the back support housing in the manner described above, wherein the bosses support the components apart slightly so that the rims do not engage one another, ensures that the pressure from the fastening means is borne by the compression of the bosses against one another. The stresses are thus entirely localized where the pressure is applied (i.e. at the bosses) and no pressure is incurred around the rim inasmuch as the rims are maintained apart by the bosses. Accordingly, few stresses are incurred across the deck plate and thus distortion of the reel body is substantially eliminated, thereby reducing binding and malfunction of the reel.

BRIEF DESCRIPTION OF THE DRAWINGS

FIG. 1A is a rear perspective of the gear and ratchet of the crankshaft;

BEST MODE FOR CARRYING OUT THE INVENTION

Figure 1:
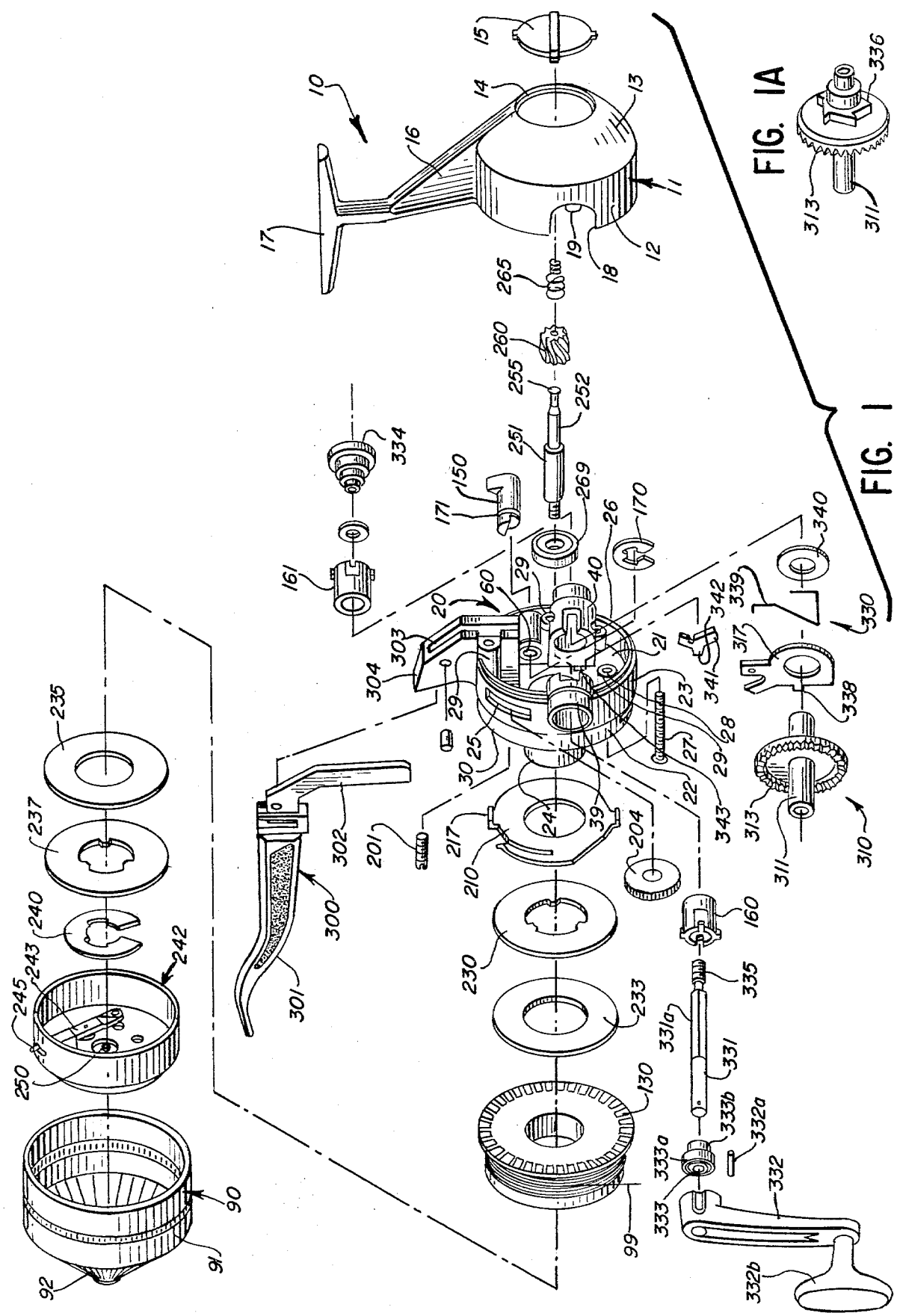
FIG. 1 is an exploded view of the fishing reel disclosed herein.

FIG. 1 generally depicts an exploded perspective view of a fishing reel 10 of the spin casting type containing the preferred embodiment of the invention. A back support housing 11, preferably made of an aluminum alloy material, has a cylindrical cover 12, one end of which is open and the other end of which merges into a semi-spherical rear wall 13 having a center opening 14 in which is seated a back cap 15. A stem 16 is integrally cast with the cylindrical cover 12 and has a mounting foot 17 which is used to attach the reel 10 to a spinning style fishing rod (not shown). A body 20, made of a plastic material, such as a glass filled polycarbonate, has a transverse deck plate 21 with a first or forward circumferential body portion 22 and a second or rearward circumferential body portion 23. A central hub 24 projects forward of the deck plate 21 with a drag plate 210, back spool washer 230, back flat drag washer 233, spool assembly 130, front flat drag washer 235, front spool washer 237, all secured to the hub 24 by means of spool retainer clip 240 which fits into a groove (not shown in FIG. 1) in the distal end of hub 24. The body 20 is secured to the back support housing 11 by inserting an inset flange 26 on the rearward body portion 23 of the body 20 into the one open end of the cylindrical cover 12 of the back support housing 11 and threading screws 27, only one of which is shown in FIG. 1, through apertures 28 in bosses 29 formed through and on the deck plate 21 and into mating bosses (not shown in FIG. 1) in the back support housing 11. A front cover 90, which has a cylindrical body portion 91 and a cone-shaped front portion 92, is secured on an offset portion 30 of the forward body portion 22.

A center shaft 251 is mounted in a center hole (not shown in FIG. 1) in the hub 24 with a spinner head assembly 242 threaded by means of the threaded opening 250 on the forward threaded end of the shaft 251. The spinner head assembly 242 partially surrounds the forward flange of the spool assembly 130 with fishing line 99 being wound thereon. The cone-shaped front portion 92 of the front cover 90 has a front hole (not shown in FIG. 1) which acts as a fishing line guide as the line 99 is cast from the reel 10 and rewound after casting.

A clutch head screw 201 passes through a pilot hole or guide (not shown in FIG. 1) in the deck plate 21 with the slotted head of the screw positioned in the interior of the forward body portion 22 and with a clutch wheel 204 projecting outward of a slot 25 in the rearward body portion 23 threadingly engaging with the body of the clutch head screw 201 where the screw projects into said rearward body portion 23. A tab 217 on the drag plate 210 fits into the head of screw 201 so that when the clutch wheel 204 is revolved upward toward stem 16, the screw 201 advances forward toward the spool retainer clip 240, increasing the clamping force on the spool assembly 130 so that the ability of the spool assembly 130 to revolve relative to the hub 24 is decreased. When the clutch wheel 204 is revolved away from the stem 16, the clamping force is decreased and the spool assembly 130 is permitted to revolve more freely relative to hub 24, thus providing the adjustable drag mechanism for the fishing reel 10.

The center shaft 251 is slidably and rotatably mounted in a bearing 269 which is mounted in the rear of the hub 24 in the deck plate 21. A pinion gear 260 is splined on a reduced diameter portion 252 of the center shaft 251 and is resiliently maintained in a forward position against the deck plate 21 by a center shaft spring 265. The pinion gear 260 and center shaft 251, being splined together, will have relative axial sliding motion, but rotation of the pinion gear 260 will rotate the center shaft 251. The spring 265 bears against an abutting end 255 on the center shaft 251 to urge the pinion gear 260 against the deck plate 21 and to urge the center shaft 251 in a rearward direction relative to the deck plate 21.

A finger brake lever 300 is mounted on the body 20 with an operating handle 301 exterior of and extending forwardly from the first or forward body portion 22. An operating leg 302 extends through a slot 303 in an unstanding bracket 304 on the body 20 and into the second or rearward body portion 23 for operable contact with the rearward end 255 of the center shaft 251. When the exterior operating handle 301 of the finger brake lever 300 is pulled upward toward the mounting foot 17, operating leg 302 engages the end 255 of the center shaft 251. The center shaft 251 and the spinner head assembly 242 mounted thereon are pushed forward relative to the bearing 269 and the hub 24. A pickup pin mechanism 243, mounted on and within spinner head assembly 242, is, at this point, in retracted position and cooperates with a forward face of a cam (not shown in FIG. 1) carried by the face of the hub 24. When the finger brake lever 300 is fully pivoted toward the mounting foot 17, the spinner head assembly 242 is held in a brake position against the inside of the front cover 90 to trap the line 99 therebetween to prevent casting of the line. Slightly releasing the finger brake lever 300 will maintain the spinner head assembly 242 in a forward casting position, but the spring 265 will retract the center shaft 251 and the spinner head assembly 242 enough to unclamp the fishing line 99 whereby the spinner head assembly 242 will not interfere with the fishing line 99 which can then be cast freely from the reel 10.

A crank assembly 310 is mounted in transversely extending hollow bearing bosses 39 and 40 integrally formed on the wall of the rearward body portion 23. Crank bearing sleeve means 160 and 161 are mounted respectively in the bearing bosses 39 and 40 to provide suitable bearings for a hollow crankshaft 311 of the crank assembly 310. The hollow crankshaft 311 supports an anti-reverse assembly 330 which will be described in more detail hereinafter.

A crank rod 331 is pivotally connected to a crank handle 332 by means of a pin 332a and the crank rod 331 is slip-fitted into the hollow crankshaft 311 and has flats 331a which mate with flats in the hollow crankshaft 311 to key the crankshaft 311 thereto. A fitting 333 which slides on the crank rod 331 inwardly of the pin 332a has an outer portion 333a that slides easily into one of the bosses 39 or 40 and has an inner portion 333b of smaller diameter which slides easily into the outer end of one of the crank bearing sleeve means 160 or 161. A crank rod nut 334 is secured to a threaded end 335 of the crank rod 331 to fasten said rod 331 to the reel 10. The crank rod 331 can be removed from the side of the reel 10 that it occupies in FIG. 1, and mounted in the opposite side by unfastening the nut 334 in sleeve means 161, removing the crank handle 332 and crank rod 331 from the hollow boss 39, inserting the crank rod 331 in the hollow boss 40, and refastening the nut 334 on the end of the rod in the sleeve means 160. The crank handle 332 has a crank knob 332b for gripping by the hand of the user.

Fixed to the hollow crankshaft 311 is a face gear 313 which is in engageable contact with the pinion gear 260 on the shaft 251 so that when the crank handle 332 is rotated in a forward direction (toward the front cover 90 as viewed in FIG. 1), the shaft 251 rotates causing the spinner head assembly 242 to rotate as well. This rotative motion disengages the pickup pin mechanism 243 from the forward face of the cam on the hub 24, causing the spinner head assembly 242 to move rearward as the pickup pin mechanism 243 rides up the cam to extend the pickup pin 245 outwardly beyond the spinner head assembly 242 so that the rotation of the crank handle 332 will rotate the spinner head assembly 242 to wind the fishing line 99 on the spool assembly 130.

Crank assembly 310 is coupled with an anti-reverse assembly 330, which comprises a ratchet 336, mounted on the crankshaft 311 against the back side of face gear 313 as shown in FIG. 1(a), an anti-reverse drag arm 337 having a transverse lug 338, a drag spring 339 and spacer washer 340 all mounted on the hollow crankshaft 311. An anti-reverse pawl 341 having a pivot tang 342 pivotably mounted in an aperture 343 in the deck plate 21, is positioned against the back of the face gear 313 between the deck plate 21 and the transverse lug 338 on the drag arm 337 for engageable and disengageable contact with the ratchet 336.

Anti-reverse actuator 150 is mounted in upper housing sleeve 60 that opens through the wall of the rearward body portion 23 of body 20 and the actuator 150 is retained in the sleeve 60 by retainer clip 170 seated in slot 171 in the body of the anti-reverse actuator 150. The anti-reverse actuator 150 is in cooperative contact, as will be described hereinafter, with the anti-reverse drag arm 317. In one position, the actuator 150 disengages the anti-reverse assembly 330 permitting the crank rod 331 and the crank assembly to rotate in either the forward direction (upward toward the stem 16) or the reverse direction (downward from the stem 16 toward the back of the reel 10). In the other position of the actuator 150, the crank assembly can rotate to wind the line 99 on the spool 130.

Figure 2:
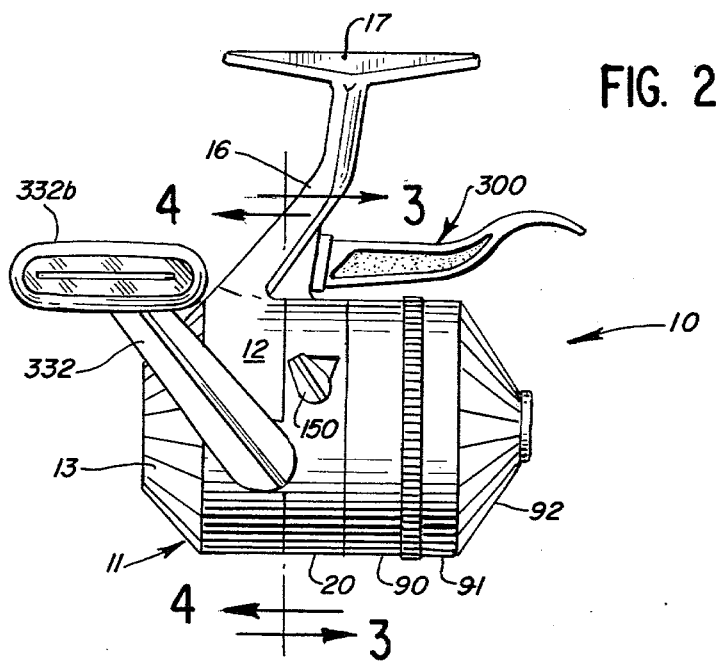
FIG. 2 is a side view of the assembled reel.

The novel feature which is claimed herein can be seen more clearly from an examination of FIGS. 2-7. The assembled fishing reel 10 is shown in FIG. 2. The back support housing 11 with its stem 16 and mounting foot 17 is secured to the reel body 20 which in turn is secured to the front cover 90. The anti-reverse actuator 150, the crank handle 332 and crank knob 332b, and the finger brake lever 300 can all be seen as they appear in the assembled reel 10.

Figure 3:
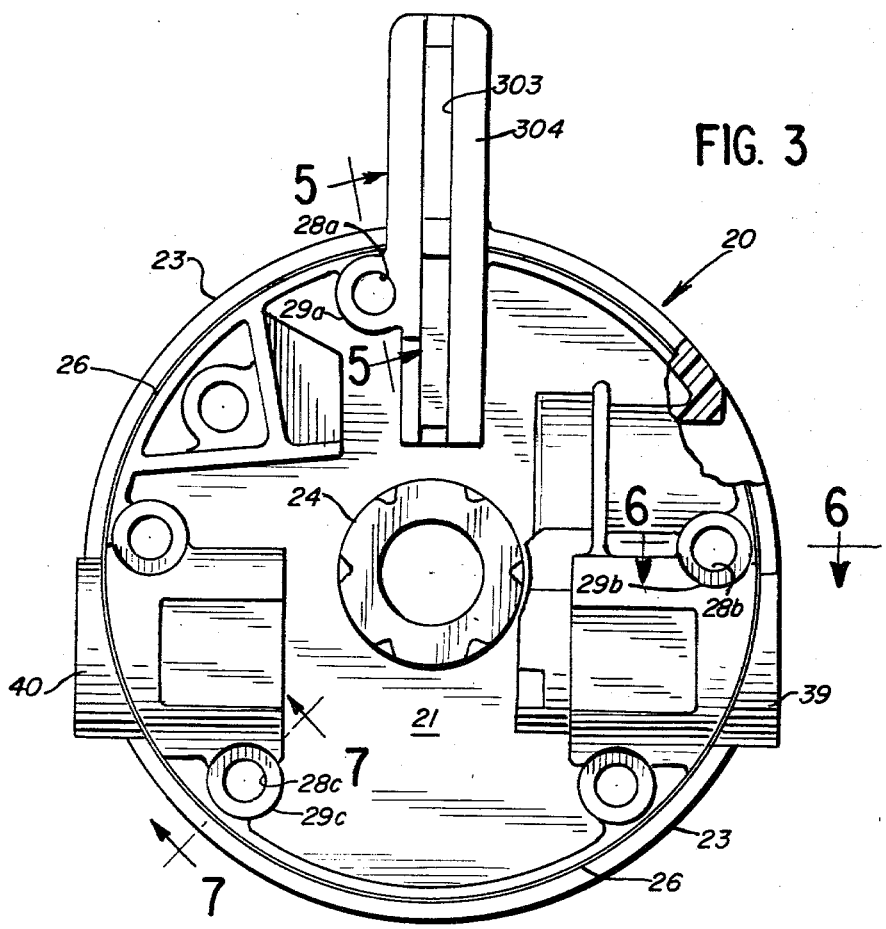
FIG. 3 is a view taken along line 3—3 of the rear end of the reel body.

FIG. 3 shows the side of the reel body 20 which faces the back support housing 11. The offset flange 26 extends around the edge of the body 20. Three bosses 29a,29b,29c are on the rear of the deck plate 21 and are spaced around the circumference of the body 20 just inside the offset flange 26. The bosses 29a,29b,29c project axially beyond the offset flange 26 as is apparent from FIGS. 5-7.

Figure 4:
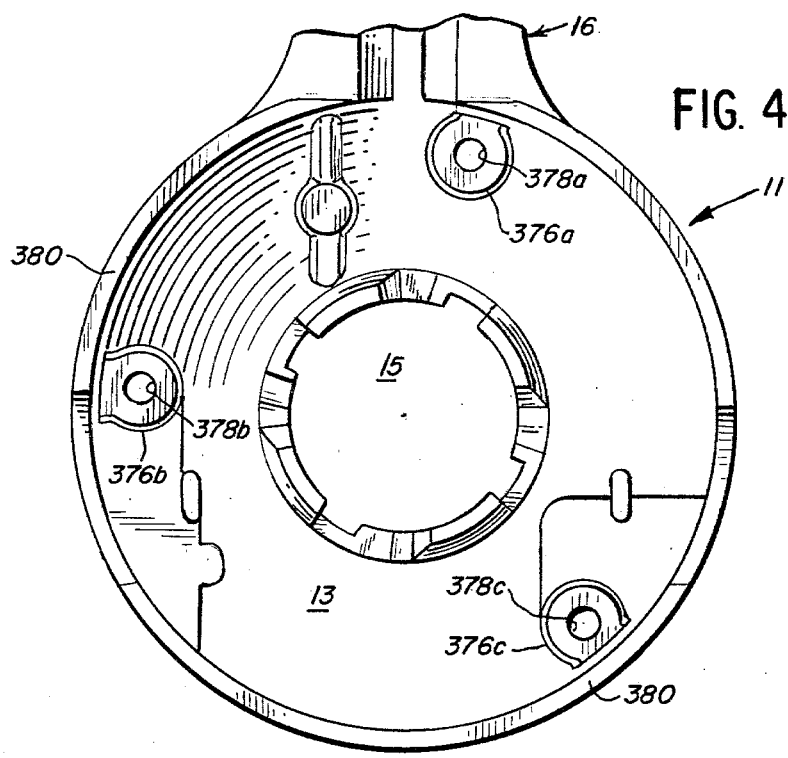
FIG. 4 is a view taken along line 4—4 of the forward end of the back support housing.

FIG. 4 shows the inside of the back support housing 11. Three mating bosses 376a,376b,376c having threaded holes 378a,378b,378c are included which align with the apertures 28a,28b,28c extending through the deck plate 21 and attached bosses 29a,29b,29c respectively (these identical features, when referred to generally or collectively, are hereafter indicated by reference to the number alone). The mating bosses 376 are slightly depressed from the rim 380 of the back support housing 11 as is apparent from FIGS. 5-7.

Figure 5:
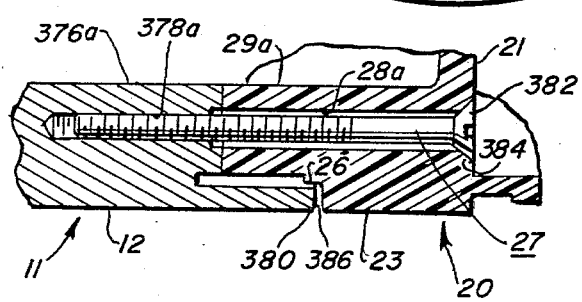
FIGS. 5–7 are partial cross-sectional views taken along their respective section lines in FIG. 3 of the boss assemblies for mounting the housing and reel body together.
Figure 6:
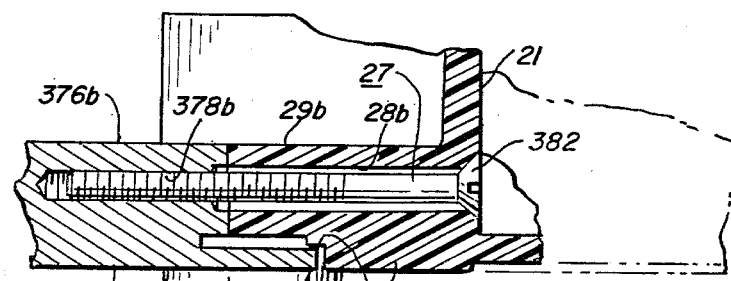
Figure 7:
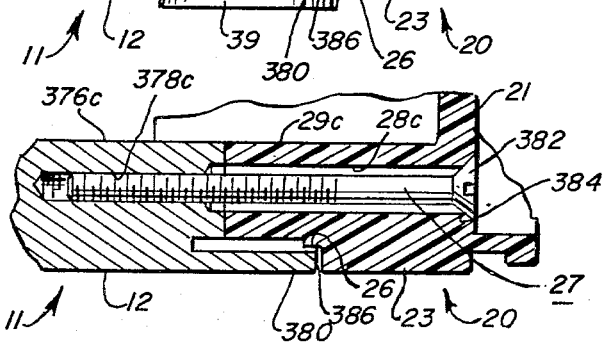

The connection of the various bosses 29,376 is shown in FIGS. 5-7. With each, a threading screw 27 extends through the aperture 28 in the boss 29 of the body 20 and screws into the threaded hole 378 of the mating boss 376. When the screw 27 is tightened, the head 382 of the screw 27 abuts the recess 384 in the end of the boss 29 to hold the body 20 together with the back support housing 11.

Importantly, a gap 386 exists between the housing rim 380 and the rearward body portion 23 so that the entire pressure exerted by the screws 27 in holding the housing 11 and body 20 together is borne by the three sets of bosses 29,376. Heretofore, the pressure from the mounting screws was exerted around substantially the entire circumference of the reel body. The stresses thereby induced across the reel body between the location of the screws and the rim resulted in slight distortion of the reel body. The distortion was frequently sufficient to cause binding and malfunctioning of the reel. The present design eliminates such stresses, thereby substantially reducing the distortion and ensuring the continued proper functioning of the reel 10.

The offset flange 26 is provided to aid in partially sealing the interior of the assembled reel 10 from the elements. This additional protection is desirable because of the gap 386 which is maintained between the back support housing 11 and the reel body 20 as detailed above.

Other aspects, objects and advantages of this invention will be apparent from an examination of the specification, drawings, and appended claims.

I claim:

1. A spin casting style fishing reel comprising:
a support housing having a stem extending therefrom for mounting to a fishing rod, said housing having an open end and a facing edge around said end;
a reel body having a deck plate and including a portion facing said housing, said portion having an offset ledge around the edge facing said housing;
three spaced apart bosses on the housing side of said deck plate and including aligned apertures through said bosses and said deck plate;
three spaced apart bosses on said housing and aligned with said reel body bosses;
fastening means extending through said apertures and into said housing bosses to hold said reel body bosses and housing bosses in abutting relation; and
said bosses when held together in abutting relation holding said housing facing edge in spaced apart relation from said reel body facing edge and offset ledge.

2. A spin casting style fishing reel comprising:
a back support housing having a stem extending therefrom for attachment to a fishing rod, said back support housing having a forwardly facing edge around the open front of said housing;
three spaced apart bosses affixed in said housing and lying parallel to each other and to a center of said housing;
a cylindrical reel body having a deck plate, including a first portion projecting forward of the deck plate and a second portion projecting rearward of the deck plate, the second rearward portion having an offset ledge formed about a rearwardly extending edge of the second portion;
three spaced apart bosses carried on the deck plate, each boss having an aperture aligned with an aperture in the deck plate and aligning with and abutting against one of the bosses in the back support housing; and
fastening means extending through the apertures in the deck plate and in the bosses carried by the deck plate and extending into the bosses in the back support housing for supporting the reel body to the back support housing with the facing edge of the back support housing in spaced apart relation with the offset ledge and rearward edge of the reel body.

* * * * *